United States Patent
Wu et al.

(10) Patent No.: US 10,976,957 B2
(45) Date of Patent: Apr. 13, 2021

(54) REDUCING MULTI-STREAM DATA WRITE COLLISION IN SOLID-STATE DATA STORAGE DEVICES

(71) Applicant: ScaleFlux, Inc., San Jose, CA (US)

(72) Inventors: Qi Wu, San Jose, CA (US); Yong Peng, Fremont, CA (US); Wenzhong Wu, Milpitas, CA (US)

(73) Assignee: SCALEFLUX, INC., San Jose, CA (US)

( * ) Notice: Subject to any disclaimer, the term of this patent is extended or adjusted under 35 U.S.C. 154(b) by 35 days.

(21) Appl. No.: 16/507,556

(22) Filed: Jul. 10, 2019

(65) Prior Publication Data

US 2020/0019340 A1   Jan. 16, 2020

Related U.S. Application Data

(60) Provisional application No. 62/695,866, filed on Jul. 10, 2018.

(51) Int. Cl.
| | |
|---|---|
| *G06F 3/06* | (2006.01) |
| *G06F 12/02* | (2006.01) |
| *G06F 13/16* | (2006.01) |
| *G06F 12/0864* | (2016.01) |
| *G06F 12/1018* | (2016.01) |

(52) U.S. Cl.
CPC .......... *G06F 3/0656* (2013.01); *G06F 3/0616* (2013.01); *G06F 3/0679* (2013.01); *G06F 12/0246* (2013.01); *G06F 12/0864* (2013.01); *G06F 12/1018* (2013.01); *G06F 13/1673* (2013.01); *G06F 3/0659* (2013.01)

(58) Field of Classification Search
None
See application file for complete search history.

(56) References Cited

U.S. PATENT DOCUMENTS

| | | | |
|---|---|---|---|
| 2010/0057979 A1* | 3/2010 | Chu | G06F 12/0246 711/103 |
| 2015/0074337 A1* | 3/2015 | Jo | G06F 3/0679 711/103 |
| 2015/0213893 A1* | 7/2015 | Parker | G11C 16/12 365/185.18 |
| 2016/0124684 A1* | 5/2016 | Zhang | G06F 3/0613 711/103 |
| 2016/0306552 A1* | 10/2016 | Liu | G06F 3/0679 |
| 2016/0334996 A1* | 11/2016 | Zhong | G06F 3/0607 |
| 2017/0199703 A1* | 7/2017 | Ravimohan | G06F 3/0659 |
| 2018/0276118 A1* | 9/2018 | Yanagida | G06F 3/0688 |
| 2019/0179751 A1* | 6/2019 | Kanno | G06F 12/0804 |

OTHER PUBLICATIONS

Mark Allen Weiss. Data Structures and Problem Solving Using Java. 2002. Addison Wesley. 2nd ed. pp. 684.*

* cited by examiner

*Primary Examiner* — Nathan Sadler
(74) *Attorney, Agent, or Firm* — Hoffman Warnick LLC (57) ABSTRACT

The present disclosure relates to the field of solid-state data storage, and particularly to improving the speed performance of solid-state data storage devices by reducing multi-stream data write collision. A method according to embodiments includes: writing a plurality of data chunks in a skewed sequence from a plurality of different data write buffers in the storage device into a plurality of different super-pages across all channels of the storage device.

12 Claims, 8 Drawing Sheets

REDUCING MULTI-STREAM DATA WRITE COLLISION IN SOLID-STATE DATA STORAGE DEVICES

TECHNICAL FIELD

The present disclosure relates to the field of solid-state data storage, and particularly to improving the speed performance of solid-state data storage devices by reducing multi-stream data write collision.

BACKGROUND

Solid-state data storage devices, which use non-volatile NAND flash memory technology, are being pervasively deployed in various computing and storage systems. In addition to including one or multiple NAND flash memory chips, each solid-state data storage device also contains a controller that manages all the NAND flash memory chips.

NAND flash memory cells are organized in an array→block→page hierarchy, where one NAND flash memory array is partitioned into a large number (e.g., thousands) of blocks, and each block contains a number (e.g., hundreds) of pages. Data are programmed and fetched in the unit of a page. The size of each flash memory page typically ranges from 8 kB to 32 kB, and the size of each flash memory block is typically tens of MBs.

NAND flash memory cells must be erased before being re-programmed, with the erase operation carried out in the unit of a block. Due to the unit size mismatch between write/read (e.g., page) and erase (e.g., block) operations, the storage device controller must carry out a garbage collection (GC) operation: before erasing a flash memory block, the controller copies all valid data from the block to other flash memory block(s). The purpose of GC is to reclaim flash memory storage space being occupied by stale flash memory pages, whose content have become invalid and useless, and make the storage space available to serve future write requests. To simplify flash memory management and improve data read/write throughput, modern solid-state storage devices carry out the GC operation in the unit of a super-block. Each super-block contains multiple physical flash memory blocks that can be read and written in parallel.

GC operations incur extra NAND flash memory read/write operations, which interfere with normal read/write requests and hence degrade the speed performance of solid-state storage devices. In one method for reducing the overhead of GC operations, data with a similar lifetime (i.e., the time duration that the data must reside in flash memory before becoming invalid) are written into the same super-block (e.g., using multi-stream data write). The basic idea can be described as follows: solid-state storage devices internally keep multiple super-blocks open for receiving new data. Let n denote the number of super-blocks that are open at the same time. Solid-state storage devices categorize all the incoming data into n groups according to their expected lifetime so that all the data in the same group tend to have a similar expected lifetime. Each group is assigned to one open super-block, and all the data belonging to the same group are written into the associated super-block.

SUMMARY

Accordingly, embodiments of the present disclosure are directed to methods for reducing multi-stream data write collision to improve the speed performance of solid-state data storage devices.

A first aspect of the disclosure is directed to a method for reducing multi-stream data write collision in a solid-state storage device, including: writing a plurality of data chunks in a skewed sequence from a plurality of different data write buffers in the storage device into a plurality of different super-pages across all channels of the storage device.

A second aspect of the disclosure is directed to a solid-state storage device, including: a plurality of data write buffers; a plurality of memory chips arranged in a plurality channels; and a controller, wherein the controller is configured to: write a plurality of data chunks in a skewed sequence from different data write buffers into a plurality of different super-pages in the memory chips across all the channels of the storage device.

A third aspect of the disclosure is directed to a program product comprising program code, which when executed, performs a method for reducing multi-stream data write collision in a solid-state storage device, the method including: writing a plurality of data chunks in a skewed sequence from a plurality of different data write buffers in the storage device into a plurality of different super-pages across all channels of the storage device.

BRIEF DESCRIPTION OF THE DRAWINGS

The numerous advantages of the present disclosure may be better understood by those skilled in the art by reference to the accompanying figures.

DETAILED DESCRIPTION

Reference will now be made in detail to embodiments of the disclosure, examples of which are illustrated in the accompanying drawings.

The multi-stream data write process can significantly reduce GC-induced overhead in solid-state storage devices. However, it may potentially cause flash memory data write collision that can degrade the write speed performance of solid-state storage devices. The present disclosure details techniques that can largely reduce the probability of data write collision, and thereby improve speed performance, when using multi-stream data write.

Figure 1:
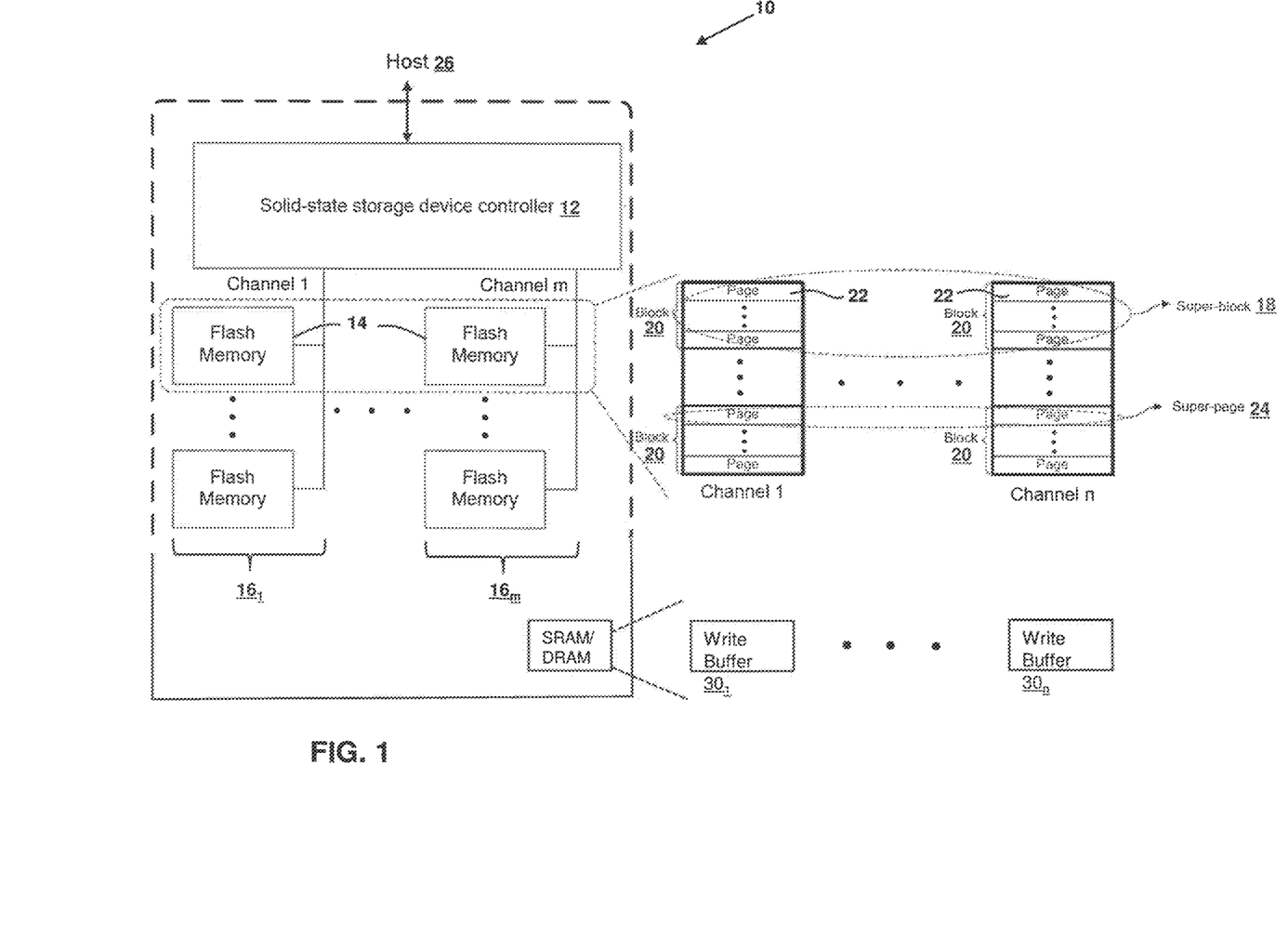
FIG. 1 illustrates the multi-channel architecture of a solid-state storage device according to embodiments.

FIG. 1 illustrates the multi-channel architecture of a NAND solid-state storage device 10 (hereafter storage device 10) according to embodiments. A solid-state storage device controller 12 (hereafter controller 12) organizes a plurality of NAND flash memory chips 14 (hereafter memory chips 14) into a plurality of m channels 16, with each channel 16 connected to one or more memory chips 14.

Memory chips 14 on different channels 16 can be accessed in parallel to improve data read/write throughput in the storage device 10.

To simplify flash memory management and fully leverage the multi-channel architecture, the garbage collection (GC) operation is carried out in the unit of a super-block 18. As illustrated in FIG. 1, spanning across all the channels 16, each super-block 18 contains multiple physical flash memory blocks 20, with one block 20 per channel 16. Since each flash memory block 20 includes a certain number (e.g., 256) of pages 22 and flash memory programming is performed in the unit of a page 22, each super-block 18 further contains a certain number (e.g., 256) of super-pages 24. As illustrated in FIG. 1, each super-page 24 includes a certain number of flash memory pages 22 from different flash memory blocks 20 spanning all the channels 16. To achieve high data write throughput inside the storage device 10, the controller 12 writes the data to one super-page 24 in parallel through the multiple independent channels 16.

The controller 12 carries out garbage collection (GC) to reclaim flash memory storage space. However, GC operations incur extra NAND flash memory read/write operations, which interfere with normal read/write requests and hence degrade the speed performance of the storage device 10. One method for reducing the overhead of GC operations involves writing data with similar a lifetime into the same super-block 18, often referred to as multi-stream data write. The concept of multi-stream data write and the deficiencies of the conventional method for performing multi-stream data write are described below with regard to FIGS. 2-4.

Figure 2:
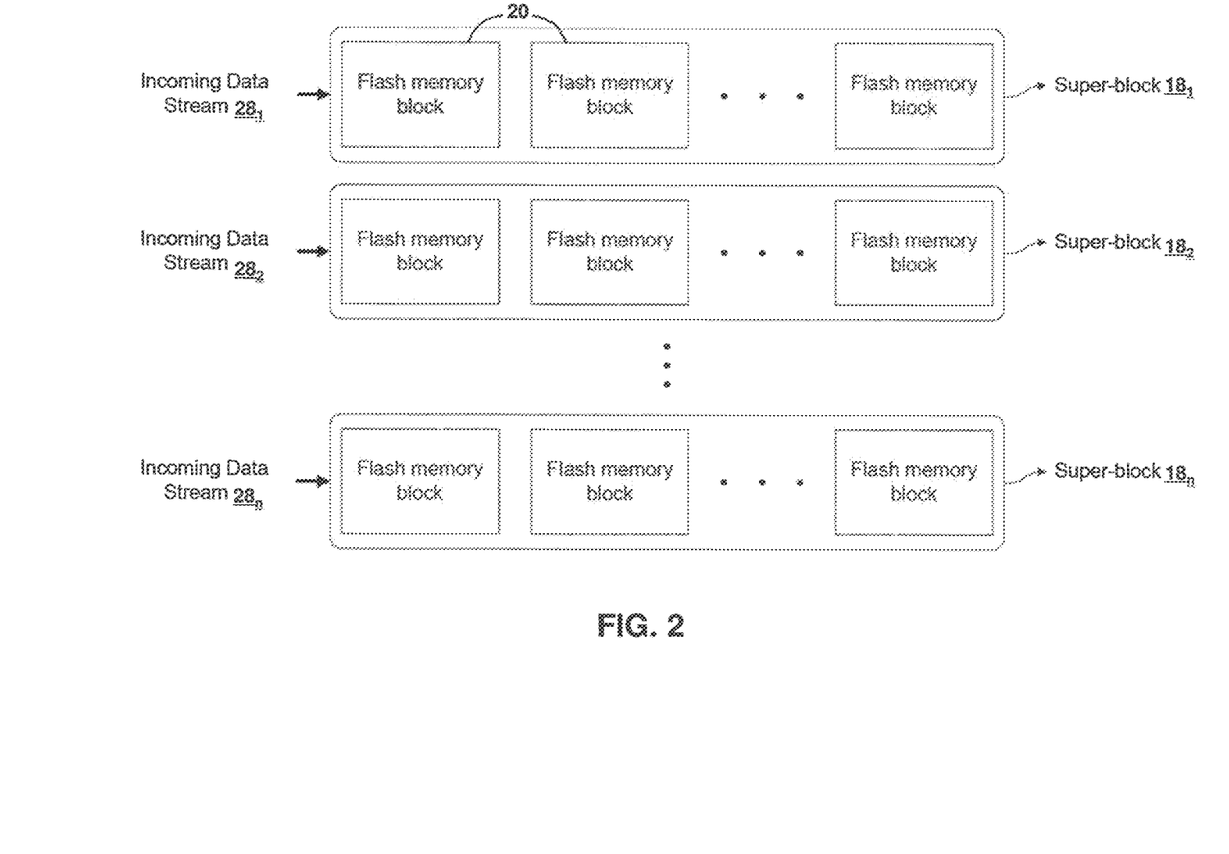
FIG. 2 illustrates the use of multi-stream data write in modern solid-state data storage devices.

Solid-state storage devices, such as storage device 10, internally keep multiple super-blocks 18 open for receiving new data (e.g., from a host computer 26). Let n denote the number of super-blocks 18 that are open at the same time. The controller 12 categorizes all the incoming data into n streams 28 according to their expected lifetime so that all the data in the same group tend to have a similar expected lifetime. Each data stream 28 is assigned to one open super-block 18, and all the data belonging to the same stream 28 are written into the associated super-block 18.

Multi-stream data write can significantly reduce the GC-induced overhead in solid-state storage devices. However, multi-stream data write may potentially cause flash memory data write collision that can degrade the write speed performance of solid-state storage devices. This can be explained as follows: let c denote the total capacity of one super-page 24 (e.g., 1 MB). In normal practice, the controller 12 always tries to buffer c amount of data using SRAM/DRAM and then altogether write the buffered data into one super-page 24 in parallel. To support multi-stream data write, the storage device 10 must maintain multiple data write buffers 30, where each data write buffer 30 is associated with one data stream 28. Let n denote the number of data streams 28. Accordingly, the controller must maintain n independent data write buffers 30, and meanwhile keep n super-blocks 18 open, where each super-block 18 receives the data from one data write buffer 30 for one data stream 28. As a result, the controller should not wait until each data write buffer 30 is full (i.e., holding c amount of data) before migrating data from one data write buffer 30 to one super-page 24 in one open super-block 18. Otherwise, it will cause significant write workload fluctuation inside the storage device.

Recall that m denotes the total number of channels 16 inside the storage device 10, and n denotes the total number of super-blocks 18 that are kept open for receiving data when the storage device 10 supports n different data write streams 28. Let $SP_i$ denote the i-th super-page 24 that receives the data from the i-th data write buffer 30 (where $i \in [1, n]$) that is associated with the i-th data stream 28, and let $P_{i,j}$ denote the flash memory page 22 that belongs the i-th super-page $SP_i$ and located on the j-th channel 16 (where $j \in [1, m]$).

Figure 3:
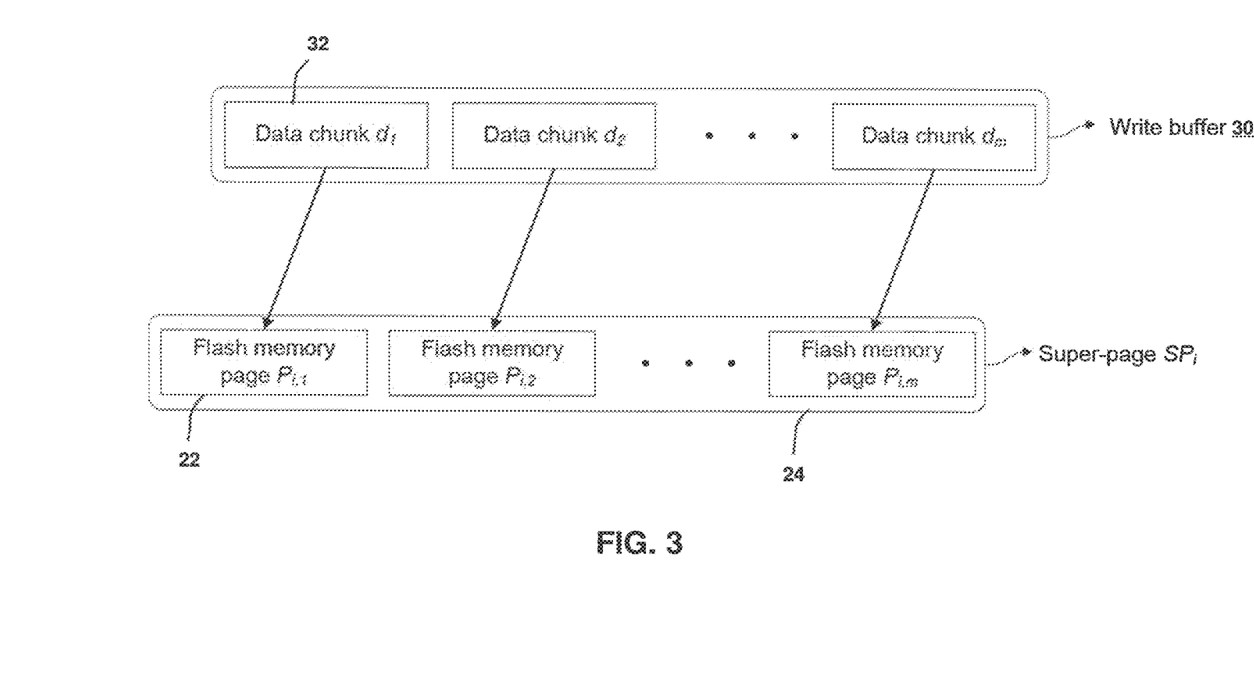
FIG. 3 illustrates the practice of migrating data from one data write buffer to one super-page.
Figure 4:
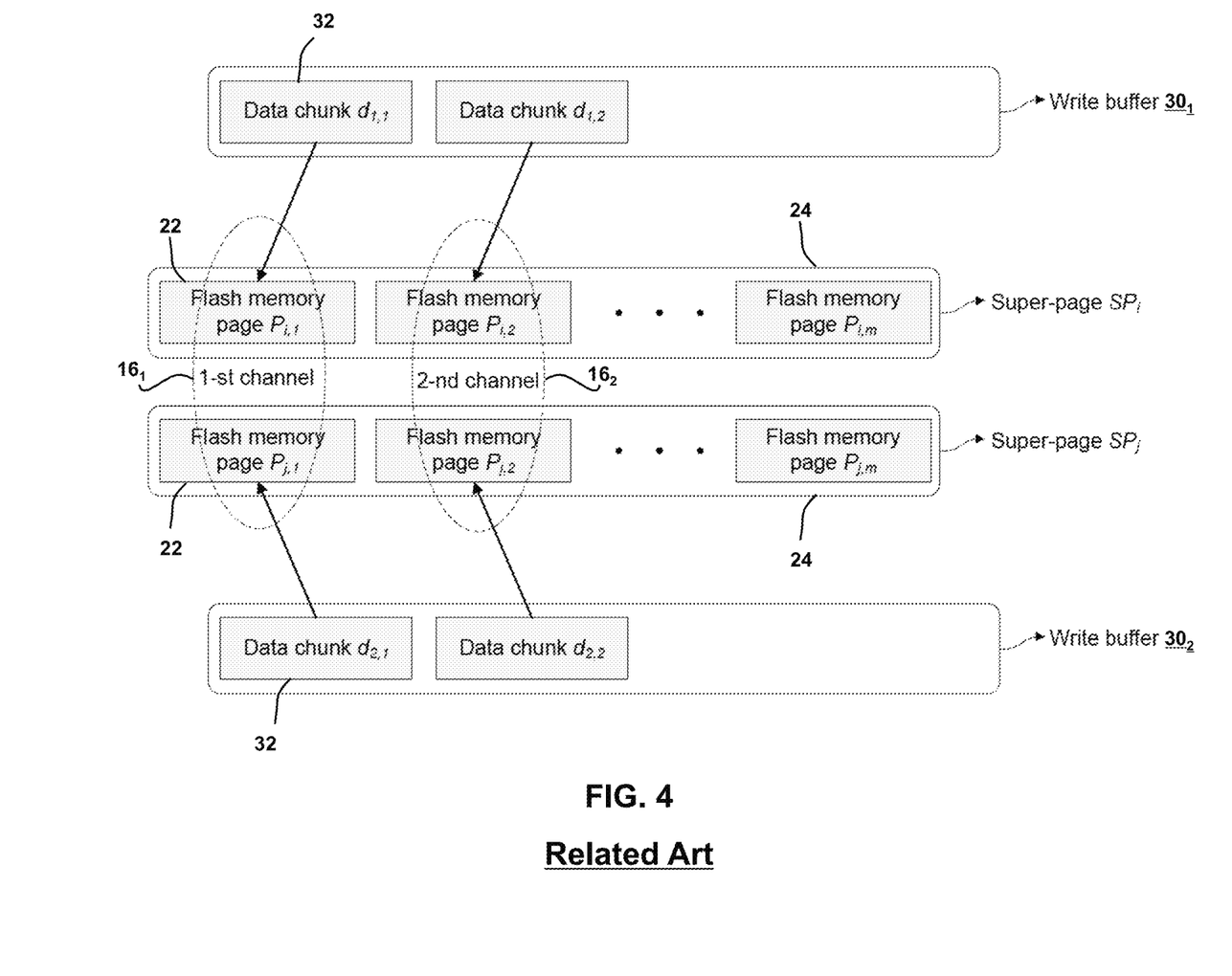
FIG. 4 illustrates the data write collision when solid-state storage devices support multi-stream write.

In conventional practice, the controller 12 of the storage device 10 will consecutively write each super-page 24 across all m channels 16. For example, as illustrated in FIG. 3, given the empty super-page $SP_i$ and a data write buffer 30 including m data chunks 32 given by $d_1, d_2, \ldots, d_m$, the controller 12 writes the data chunk $d_1$ to the flash memory page $P_{i,1}$ on the 1-st channel 16, writes the data chunk $d_2$ to the flash memory page $P_{i,2}$ on the 2-nd channel 16, and so on. However, such conventional practice may cause data write collision inside the storage device 10. For example, as illustrated in FIG. 4, suppose there are two empty super-pages $SP_1$ and $SP_2$ that receive data from two data write buffers $30_1, 30_2$. The first data write buffer $30_1$ contains two data chunks $d_{1,1}$ and $d_{1,2}$, and the second data write buffer $30_2$ contains two data chunks $d_{2,1}$ and $d_{2,2}$. When following conventional practice, the controller 12 of the storage device 10 writes both of the data chunks $d_{1,1}$ and $d_{2,1}$ to the flash memory pages $P_{i,1}$ and $P_{i,1}$ Po on the 1-st channel $16_1$. However, on each channel 16, only one flash memory page 22 can be written at one time. Hence, writing both data chunks $d_{1,1}$ and $d_{2,1}$ to the flash memory pages $P_{i,1}$ and $P_{i,1}$ on the 1-st channel $16_1$ causes data write collision. To this extent, the controller 12 must wait until the data chunk $d_{1,1}$ has been written to the flash memory page $P_{i,1}$ on the 1-st channel $16_1$ before writing the data chunk $d_{2,1}$ to the flash memory page $P_{i,1}$. Such data write collision directly degrades the data write throughput inside solid-state storage devices.

The present disclosure describes several methods for reducing data write collision to improve flash memory write parallelism inside solid-state storage devices when supporting multi-stream write. A first method is described with regard to FIGS. 5 and 6. A second method is described with regard to FIGS. 7 and 8.

Figure 5:
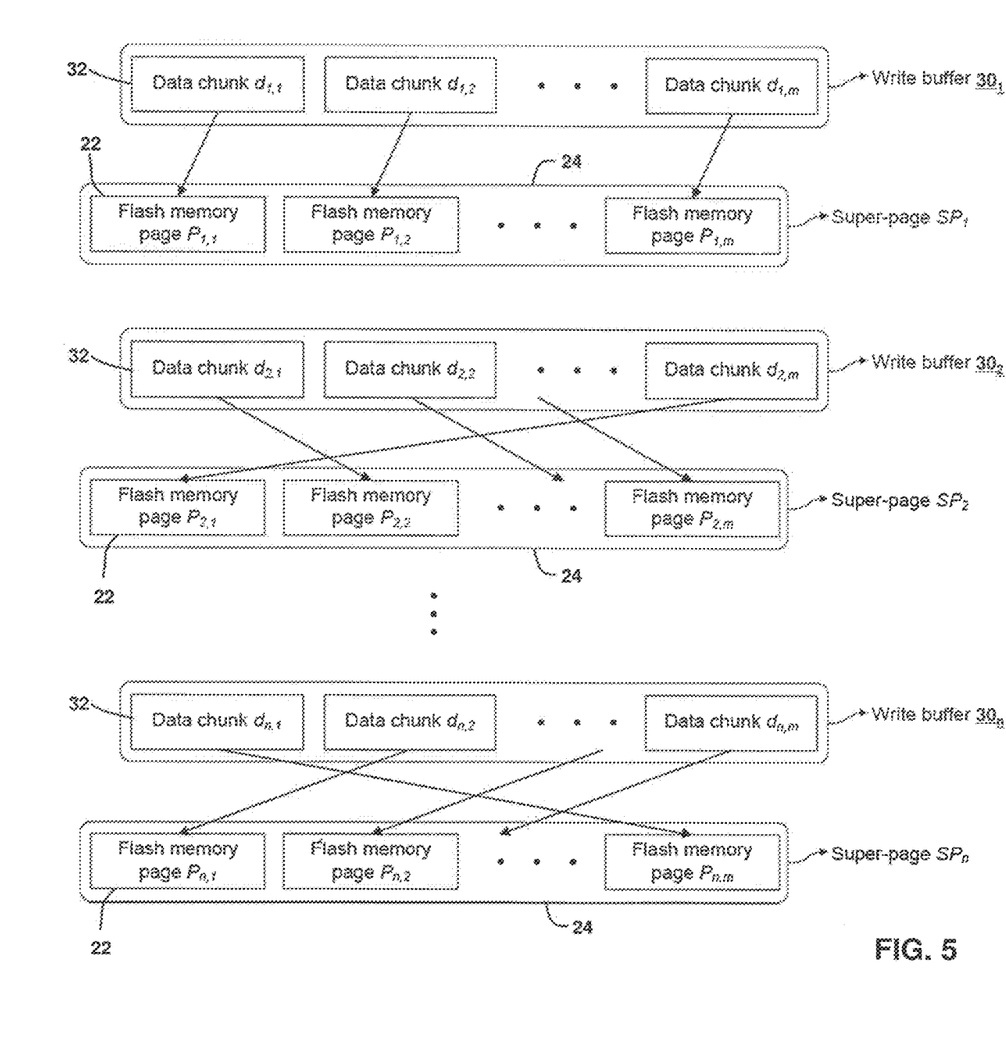
FIG. 5 illustrates a method for reducing multi-stream data write collision according to embodiments.
Figure 6:
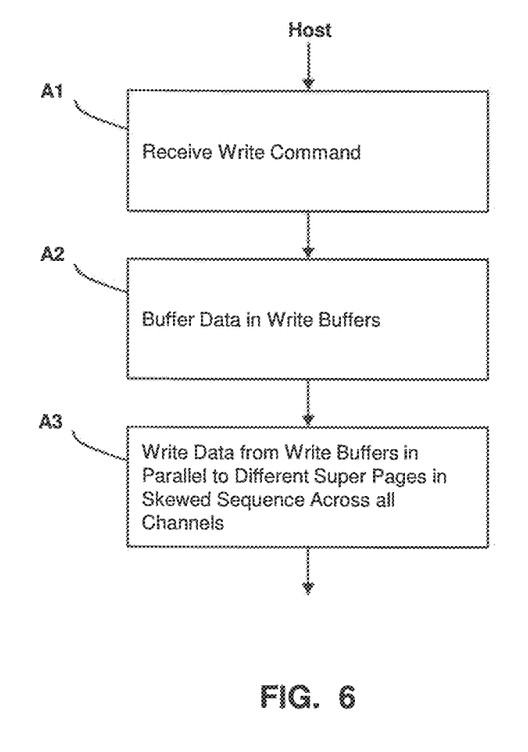
FIG. 6 depicts a flow diagram of a method for reducing multi-stream data write collision according to embodiments.

According to embodiments, referring concurrently to FIGS. 5 and 6, the first method reduces data write collision by introducing constant write sequence skewing. FIG. 5 depicts n super-pages 24 ($SP_1, SP_2, \ldots, SP_n$) that receive data from n data write buffers 30 ($30_1, 30_2, \ldots 30_n$) for n data streams. Recall that $P_{i,j}$ denotes the flash memory page 22 that belongs the i-th super-page 24 ($SP_i$) and is located on the j-th channel 16, where $j \in [1, m]$. Meanwhile, let $d_{i,j}$ denote the j-th data chunk 32 in the i-th data write buffer 30. In order to reduce data write collision, for the k-th data write buffer 30, the first data chunk $d_{k,1}$ of the k-th data write buffer 30 is written to the k-th flash memory page $P_{k,k}$ in the k-th super-page $SP_k$ on the k-th channel 16, the second data chunk $d_{k,2}$ of the k-th data write buffer 30 is written to the [(k+1) mod m]-th flash memory page $P_{k,[(k+1) mod\ m]}$ in the k-th super-page $SP_k$ on the [(k+1) mod m]-th channel 16, and so on. In another words, for the k-th data write buffer 30 ($WB_k$), its j-th data chunk $d_{k,j}$ is written to the [(k+j−1) mod m]-th flash memory page $P_{k,[(k+j-1) mod\ m]}$ in the k-th super-page $SP_k$ on the [(k+j−1) mod m]-th channel 16. Therefore, the data chunks 32 from different data write buffers 30 are written in parallel to different super-pages 24 in a skewed sequence across all the channels 16. This reduces the data write collision, especially when different data write buffers 30 experience similar incoming data throughput.

Table 1 illustrates an example of how the controller 12 may write data chunks 28 from n different data write buffers 30 across all of the m different channels 16 in parallel with a skewed sequence to different super-pages 24 to avoid data write collision:

| $WB_k$ | $d_{kj}$ | Channel | $P_{k,[(k+j-1) \bmod m]}$ |
|---|---|---|---|
| 1 | 1, 1 | 1 | 1, 1 |
| 2 | 2, 2 | 2 | 2, 3 |
| 3 | 3, 3 | 3 | 3, 5 |
| ... | ... | ... | ... |
| n | n, m | m | [(n + m − 1) mod m] |

The process for reducing data write collision depicted in FIG. 5 is further described with regard to the flow diagram presented in FIG. 6 and with reference to FIG. 1.

At process A1, the controller 12 receives a write command (e.g., from the host computer 26) to write data to the storage device 10. At process A2, the controller 12 buffers the data into a plurality of data write buffers 30. At process A3, the controller 12 writes the data from the data write buffers 30 to one or more super-pages 24 in the memory chips 14.

To perform process A3, the controller 12 writes the data in the data write buffers 30 in parallel to different super-pages 24 in the memory chips 14 in a skewed sequence across all of the channels 16 of the storage device 10. In particular, as described in detail above and illustrated in FIG. 5, for the k-th data write buffer 30, the controller 12 writes its j-th data chunk $d_{k,j}$ to the [(k+j−1) mod m]-th flash memory page $P_{k,[(k+j-1) \bmod m]}$ in the k-th super-page $SP_k$ on the [(k+j−1) mod m]-th channel 16.

Although quite effective in reducing data write collision, the above technique may suffer from some data write collision when different data write buffers 30 experience different incoming data throughput. According to embodiments, to address this issue, this present disclosure describes a second design technique for reducing data write collision that uses a randomized data write sequence.

Figure 7:
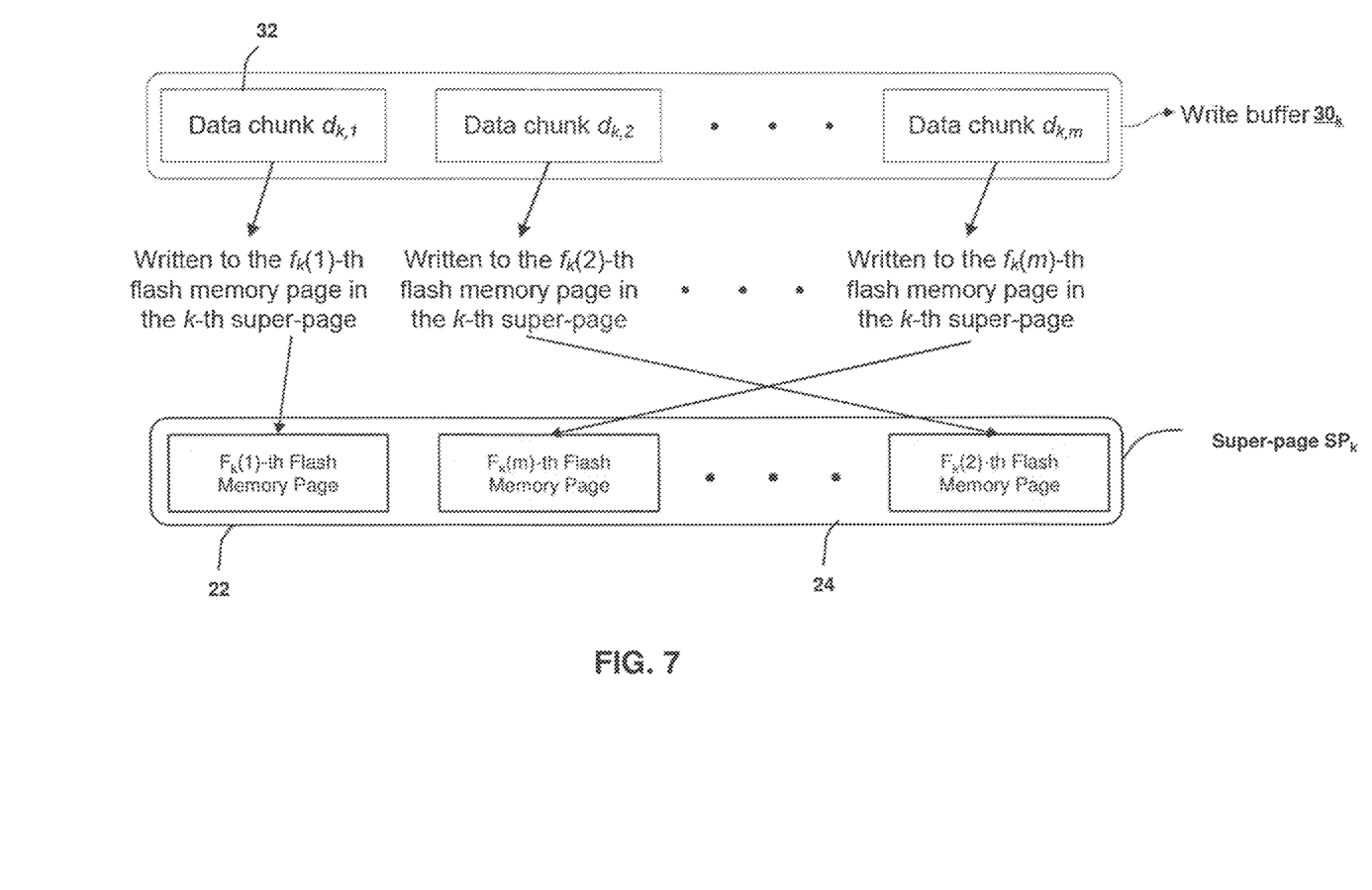
FIG. 7 illustrates a method for reducing multi-stream data write collision according to other embodiments.

According to embodiments, for the i-th data write buffer 30, a fixed hashing function $f_i(k)$ is assigned that hashes each input $k \in [1, m]$ to an output $f_i(k) \in [1, m]$. As illustrated in FIG. 7, for example, for the k-th data write buffer $30_k$, the controller 12 of the storage device 10 writes the j-th data chunk $d_{k,j}$ in the data write buffer $30_k$ to the $f_k(j)$-th flash memory page 22 in the k-th super-page 24 on the $f_k(j)$-th channel 16. In another words, the data from each data write buffer 30 are no longer consecutively written to one super-page 24 across all the channels 16. Rather, the data from each data write buffer 30 is written in a randomized sequence to one super-page 24 across all the channels 16. With different hashing functions, data from different data write buffers 30 are written to different super-pages 24 with completely different patterns. Advantageously, this may further reduce data write collision even when different data write buffers 30 experience different incoming data throughput.

Figure 8:
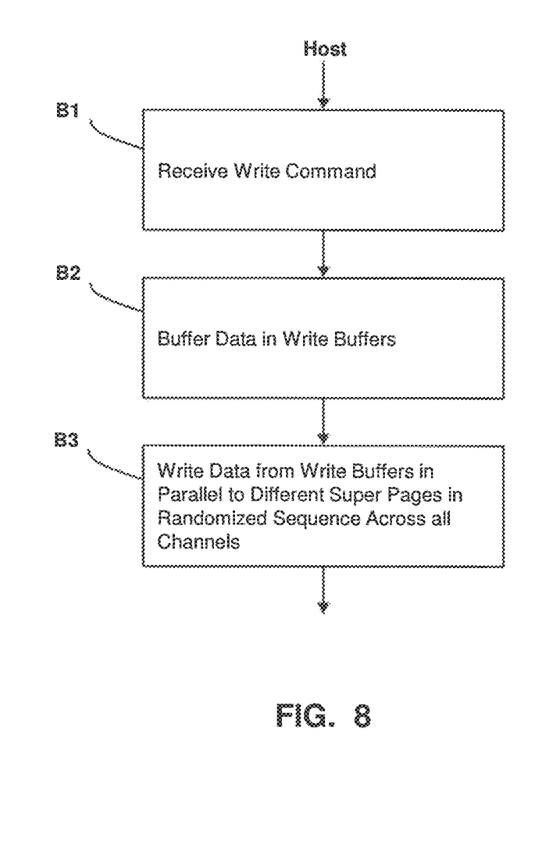
FIG. 8 depicts a flow diagram of a method for reducing multi-stream data write collision according to other embodiments.

The process for reducing data write collision depicted in FIG. 7 is further described with regard to the flow diagram presented in FIG. 8 and with reference to FIG. 1.

At process B1, the controller 12 receives a write command (e.g., from the host computer 26) to write data to the storage device 10. At process B2, the controller 12 buffers the data into a plurality of data write buffers 30. At process B3, the controller 12 writes the data from the data write buffers 30 to one or more super-pages 24 in the memory chips 14.

To perform process B3, the controller 12 writes the data in the data write buffers 30 in parallel to different super-pages 24 in the memory chips 14 in a randomized sequence across all of the channels 16 of the storage device 10. In particular, as described in detail above and illustrated in FIG. 7, for the i-th data write buffer 30, a fixed hashing function $f_i(k)$ is assigned that hashes each input $k \in [1, m]$ to an output $f_i(k) \in [1, m]$. Different hashing functions may be applied to different write buffers 30.

It is understood that aspects of the present disclosure may be implemented in any manner, e.g., as a software program, or an integrated circuit board or a controller card that includes a processing core, I/O and processing logic. Aspects may be implemented in hardware or software, or a combination thereof. For example, aspects of the processing logic may be implemented using field programmable gate arrays (FPGAs), ASIC devices, or other hardware-oriented system.

Aspects may be implemented with a computer program product stored on a computer readable storage medium. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, etc. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Python, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

The computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. The computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by hardware and/or computer readable program instructions.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The foregoing description of various aspects of the present disclosure has been presented for purposes of illustration and description. It is not intended to be exhaustive or to limit the concepts disclosed herein to the precise form disclosed, and obviously, many modifications and variations are possible. Such modifications and variations that may be apparent to an individual in the art are included within the scope of the present disclosure as defined by the accompanying claims.

The invention claimed is:

1. A method for reducing multi-stream data write collision in a solid-state storage device, comprising:
    writing a plurality of data chunks in a skewed sequence from a plurality of different data write buffers in the storage device into a plurality of different super-pages across all m channels of the storage device,
    wherein, for a k-th data write buffer of the plurality of different data write buffers, a j-th data chunk of the plurality of data chunks is written to a [(k+j−1) mod m]-th memory page in the k-th super-page of the plurality of different super-pages on the [(k+j−1) mod m]-th channel of the storage device.

2. The method according to claim 1, wherein the data chunks are written in parallel to the plurality of different super-pages.

3. The method according to claim 1, wherein the skewed sequence comprises a non-consecutive sequence.

4. The method according to claim 1, wherein the storage device comprises a NAND flash memory storage device.

5. A program product provided on a non-transitory storage medium, comprising program code, which when executed, performs a method for reducing multi-stream data write collision in a solid-state storage device, the method comprising:
    writing a plurality of data chunks in a skewed sequence from a plurality of different data write buffers in the storage device into a plurality of different super-pages across all m channels of the storage device,
    wherein, for a k-th data write buffer of the plurality of different data write buffers, a j-th data chunk of the plurality of data chunks is written to a [(k+j−1) mod m]-th memory page in the k-th super-page of the plurality of different super-pages on the [(k+j−1) mod m]-th channel of the storage device.

6. The program product according to claim 5, wherein the storage device comprises a NAND flash memory storage device.

7. The program product according to claim 5, further comprising writing the data chunks in parallel to the plurality of different super-pages.

8. The program product according to claim 5, wherein the skewed sequence comprises a non-consecutive sequence.

9. A solid-state storage device, comprising:
    a plurality of data write buffers;
    a plurality of memory chips arranged in a plurality of m channels; and
    a controller, wherein the controller is configured to:
        write a plurality of data chunks in a skewed sequence from different data write buffers into a plurality of different super-pages in the memory chips across all the channels of the storage device;
        wherein, for a k-th data write buffer, a j-th data chunk of the plurality of data chunks is written to a [(k+j−1) mod m]-th memory page in the k-th super-page of the plurality of different super-pages on the [(k+j−1) mod m]-th channel of the storage device.

10. The storage device according to claim 9, wherein the storage device comprises a NAND flash memory storage device.

11. The storage device according to claim 9, wherein the data chunks are written in parallel to the plurality of different super-pages.

12. The storage device according to claim 9, wherein the skewed sequence comprises a non-consecutive sequence.

* * * * *